United States Patent
Seike et al.

(10) Patent No.: US 10,465,713 B2
(45) Date of Patent: Nov. 5, 2019

(54) ROTARY FLUID ELEMENT AND METHOD OF CORRECTING UNBALANCE OF ROTARY FLUID ELEMENT

(71) Applicant: MITSUBISHI HEAVY INDUSTRIES ENGINE & TURBOCHARGER, LTD., Sagamihara-shi (JP)

(72) Inventors: Nariaki Seike, Tokyo (JP); Hideo Mori, Tokyo (JP); Hiroshi Nakagawa, Tokyo (JP)

(73) Assignee: MITSUBISHI HEAVY INDUSTRIES ENGINE & TURBOCHARGER, LTD., Sagamihara-Shi, Kanagawa (JP)

( * ) Notice: Subject to any disclaimer, the term of this patent is extended or adjusted under 35 U.S.C. 154(b) by 430 days.

(21) Appl. No.: 15/114,749

(22) PCT Filed: Mar. 5, 2014

(86) PCT No.: PCT/JP2014/055583
§ 371 (c)(1),
(2) Date: Jul. 27, 2016

(87) PCT Pub. No.: WO2015/132896
PCT Pub. Date: Sep. 11, 2015

(65) Prior Publication Data
US 2016/0363134 A1    Dec. 15, 2016

(51) Int. Cl.
*F01D 5/02* (2006.01)
*F04D 29/66* (2006.01)
(Continued)

(52) U.S. Cl.
CPC ........... *F04D 29/662* (2013.01); *F01D 5/027* (2013.01); *F04D 29/284* (2013.01);
(Continued)

(58) Field of Classification Search
CPC ...... F04D 29/662; F04D 29/668; F01D 5/027; G01M 1/34; F16F 15/32
See application file for complete search history.

(56) References Cited

U.S. PATENT DOCUMENTS 2,658,455 A * 11/1953 Seinfeld .............. F04D 29/2211
415/106
4,060,337 A * 11/1977 Bell, III ................ F04D 29/284
416/186 R (Continued)

FOREIGN PATENT DOCUMENTS

| CN | 101542127 A | 9/2009 |
| CN | 201925182 U | 8/2011 |

(Continued)

OTHER PUBLICATIONS

Chinese Office Action and Search Report issued in Chinese Application No. 201480074367.6 dated Aug. 2, 2017, together with an English translation of the Office Action.
(Continued)

*Primary Examiner* — Carlos A Rivera
*Assistant Examiner* — Behnoush Haghighian
(74) *Attorney, Agent, or Firm* — Birch, Stewart, Kolasch & Birch, LLP

(57) ABSTRACT

An object is to provide a rotary fluid element and a method of correcting unbalance of a rotary fluid element, whereby unbalance of the rotary fluid element can be corrected multiple times in a necessary and sufficient amount without sacrificing strength of blades. A rotary fluid element includes: a plurality of blades extending in a centrifugal direction on an outer peripheral surface of a boss portion and disposed at intervals in a circumferential direction; and a cut-remove portion for reducing unbalance disposed in a blade gap between the blades adjacent in the circumferential direction. The cut-remove portion includes a first cut-re-
(Continued)

move portion which is cut and removed on a radially-outer rim portion between the blades, and an additional cut-remove portion which is cut and removed on a radially-inner portion disposed inside the first cut-remove portion with respect to a radial direction.

10 Claims, 9 Drawing Sheets

(51) Int. Cl.
  *F04D 29/28* (2006.01)
  *F16F 15/32* (2006.01)
  *G01M 1/34* (2006.01)
(52) U.S. Cl.
  CPC .......... *F04D 29/666* (2013.01); *F04D 29/668* (2013.01); *F05D 2220/40* (2013.01); *F05D 2230/10* (2013.01); *F05D 2230/14* (2013.01); *F16F 15/32* (2013.01); *G01M 1/34* (2013.01)

(56) References Cited

U.S. PATENT DOCUMENTS

| | | | | |
|---|---|---|---|---|
| 4,890,980 | A * | 1/1990 | Heald | F04D 29/2266 416/181 |
| 5,165,857 | A | 11/1992 | Furukawa et al. | |
| 5,224,821 | A * | 7/1993 | Ozawa | F04D 29/2266 415/169.1 |
| 6,893,207 | B2 * | 5/2005 | Kao | F04D 29/2288 415/58.2 |
| 7,326,029 | B2 * | 2/2008 | Ahlroth | F04D 29/2266 415/104 |
| 8,221,070 | B2 * | 7/2012 | Baryshnikov | F04D 29/2266 415/104 |
| 9,217,331 | B1 * | 12/2015 | Yellapragada, Sr. | ... F01D 5/027 |
| 9,689,402 | B2 * | 6/2017 | Elebiary | F04D 29/40 |
| 9,874,100 | B2 * | 1/2018 | Otsubo | F01D 5/027 |
| 2006/0250033 | A1 * | 11/2006 | Vasilescu | F04D 29/662 310/62 |
| 2010/0247313 | A1 | 9/2010 | Baryshnikov | |
| 2018/0163738 | A1 * | 6/2018 | Merritt | F04D 29/053 |

FOREIGN PATENT DOCUMENTS

| | | |
|---|---|---|
| CN | 202659564 U | 1/2013 |
| EP | 0 348 846 A2 | 1/1990 |
| EP | 2090787 A1 | 8/2009 |
| GB | 2 046 360 A | 11/1980 |
| JP | 57-188996 U | 11/1982 |
| JP | 6-221297 A | 8/1994 |
| JP | 2012-219723 A | 11/2012 |
| JP | 2013-3021 A | 1/2013 |
| JP | 2013-15432 A | 1/2013 |
| JP | 2013-15472 A | 1/2013 |

OTHER PUBLICATIONS

International Preliminary Report on Patentability and Written Opinion of the International Searching Authority (Forms PCT/IB/338, PCT/IB/373, PCT/IB/326 and PCT/ISA/237), dated Sep. 15, 2016, for International Application No. PCT/JP2014/055583, with an English translation of the Written Opinion.
International Search Report and English translation thereof (Forms PCT/ISA/220 and PCT/ISA/210), dated May 13, 2014, for International Application No. PCT/JP2014/055583.
Extended European Search Report dated May 8, 2017 issued in the corresponding EP Application No. 14884542.3.

* cited by examiner

FIG. 6
REGION A1
| AMOUNT OF UNBALANCE | CUT AMOUNT |
|---|---|
| U1 | C1 |
| U2 | C2 |
| U3 | C3 |
| ⋮ | ⋮ |
| Un | Cn(max) |
REGION A2
| AMOUNT OF UNBALANCE | CUT AMOUNT |
|---|---|
| U1 | C1 |
| U2 | C2 |
| U3 | C3 |
| ⋮ | ⋮ |
| Un | Cn(max) |
REGION A3
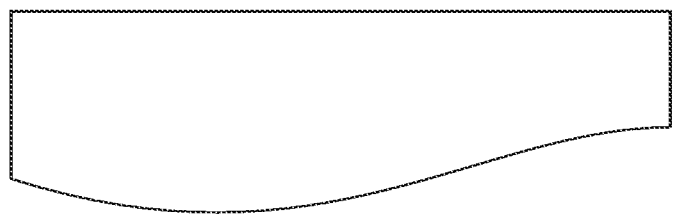

ROTARY FLUID ELEMENT AND METHOD OF CORRECTING UNBALANCE OF ROTARY FLUID ELEMENT

TECHNICAL FIELD

The present disclosure relates to a rotary fluid element including a plurality of blades extending in a centrifugal direction on an outer peripheral surface of a boss portion and disposed at intervals in a circumferential direction, as well as a method of correcting unbalance of the rotary fluid element.

BACKGROUND ART

In recent years, precision and speed of a rotary fluid element are more and more increasing due to advancement in technology, and thus higher performance and functionality are required. During operation of a rotary machine, the biggest factors in deterioration of performance of the machine are considered to be vibration and accompanying noise. Thus, to reduce vibration and noise, unbalance of a rotary fluid element should be corrected.

In view of this, a typical method of correcting unbalance of a rotary fluid element has been performed, which is to cut and remove at least one of a part of a nut or a part of a side face of a rotary fluid element in accordance with an amount of unbalance of the rotary fluid element, the nut being provided to mount the rotary fluid element to a rotary shaft.

Further, Patent Document 1 discloses a processing method for correcting unbalance, describing a rotary fluid element (turbine wheel, compressor wheel) of a supercharger as an example of a rotary fluid element. In this processing method for correcting unbalance, a plurality of cut-remove portions is set at a predetermined angular interval in the circumferential direction between blades of a rotary fluid element (turbine wheel, compressor wheel) subject to removal, an unbalance vector representing an amount and an azimuth direction of unbalance of a rotary fluid element is measured, and the unbalance vector is divided into divided vectors at a pair of cut-remove portions disposed on either side of the azimuth direction of the unbalance vector. If an unbalance amount corresponding to each divided vector is greater than the maximum amount that can be cut and removed for the corresponding cut-remove portion, the divided vector is divided again into divided vectors at a pair of cut-remove portions disposed on either side of the azimuth direction, and the re-division is repeated until an unbalance mount corresponding to each divided vector reaches or falls below the maximum amount that can be cut and removed for the corresponding cut-remove portion, before cutting and removing the resulting cut-remove portions.

In this processing method for correcting unbalance described in Patent Document 1, on the basis of a measured unbalance vector, processing is performed on a single location radially outside a cut-remove portion of a rotary member corresponding to the unbalance vector, or at each location (multiple locations in total) radially outside each of a plurality of different cut-remove portions of the rotary member corresponding to divided vectors.

Herein, an amount of unbalance is represented by a product of mass and length, and thus a correction amount of unbalance can be increased with a greater length. Accordingly, unbalance is normally corrected by cutting and removing a radially-outside rim portion of a rotary fluid element.

CITATION LIST

Patent Literature

Patent Document 1: JP2013-15432A (see FIG. 4)

SUMMARY

Problems to be Solved

However, if unbalance remaining after the first unbalance correction is to be re-corrected, it may be necessary to perform correction on the same location corrected in the first correction again, depending on the amount and position of the remaining unbalance. In this case, the once-corrected location should be re-corrected, and thus a desired correction amount may not be always achievable, which causes a larger amount of unbalance to remain uncorrected. Furthermore, excessive re-correction may lead to a decrease in the strength of a blade disposed adjacent to a cut-remove portion (a gap between blades) of a rotary member.

In view of the above, an object of at least some embodiments of the present invention is to provide a rotary fluid element and a method of correcting unbalance of a rotary fluid element, whereby unbalance of the rotary fluid element can be corrected multiple times in a necessary and sufficient amount without sacrificing the strength of blades.

Solution to the Problems

A rotary fluid element according to some embodiments of the present invention includes: a plurality of blades extending in a centrifugal direction on an outer peripheral surface of a boss portion and disposed at intervals in a circumferential direction; and a cut-remove portion for reducing unbalance, disposed in a blade gap between blades which are arranged adjacent in the circumferential direction. The cut-remove portion includes a first cut-remove portion which is cut and removed on a radially-outer rim portion in the blade gap, and at least one additional cut-remove portion which is cut and removed on a radially-inner portion disposed inside the first cut-remove portion (74c1) with respect to a radial direction.

In this case, the cut-remove portion of the rotary fluid element includes: the first cut-remove portion which is cut and removed on a radially-outer rim portion between the blades; and the additional cut-remove portion which is cut and removed on a radially-inner portion disposed inside the first cut-remove portion with respect to a radial direction, and thus, portions to be cut and removed in unbalance correction are disposed on different locations from each other. Thus, even after multiple unbalance corrections are performed on the rotary fluid element, it is possible to cut and remove a necessary and sufficient amount of unbalance, and to obtain a rotary fluid element whose blade strength is not reduced.

In some embodiments, the first cut-remove portion is disposed in an annular region disposed outermost in the radial direction among a plurality of annular regions which are concentric and centered at a rotational center of the rotary fluid element and which have different radii, the additional cut-remove portion is disposed within an annular region other than the annular region disposed outermost in the radial direction, and, if a plurality of the additional cut-remove portions is provided, the additional cut-remove portions are disposed in different annular regions from one another.

In this case, the first cut-remove portion is disposed in an annular region disposed outermost in the radial direction among a plurality of annular regions which are concentric and centered at a rotational center of the rotary fluid element and which have different radii, and the additional cut-remove portion is disposed within an annular region other than the annular region disposed outermost in the radial direction, and thus, the first cut-remove portion and the additional cut-remove portion are disposed on different locations from each other. Thus, even after multiple unbalance corrections are performed on the rotary fluid element, it is possible to cut and remove a necessary and sufficient amount of unbalance, and to obtain a rotary fluid element whose blade strength is not reduced.

In some embodiments, the first cut-remove portion is disposed in one of a pair of phase regions disposed on opposite phases from each other, on one side and the other side in the radial direction across a rotational center of the rotary fluid element, and the additional cut-remove portion is disposed within the phase region opposite from the phase region in which the first cut-remove portion is disposed.

In this case, the first cut-remove portion is disposed in one of a pair of phase regions, and the additional cut-remove portion is disposed within the phase region opposite from the phase region in which the first cut-remove portion is disposed, and thus, the first cut-remove portion and the additional cut-remove portion are disposed on different locations from each other. Thus, even after multiple unbalance corrections are performed on the rotary fluid element, it is possible to cut and remove a necessary and sufficient amount of unbalance, and to obtain a rotary fluid element whose blade strength is not reduced.

In some embodiments, the additional cut-remove portion extends continuously inward in the radial direction from the first cut-remove portion, within the blade gap in which the first cut-remove portion is disposed.

In this case, the additional cut-remove portion extends continuously inward in the radial direction from the first cut-remove portion, within the blade gap in which the first cut-remove portion is disposed, and thus, if an amount of unbalance is relatively large, the large amount of unbalance can be removed at once in the second cutting work. Accordingly, it is possible to improve workability of the unbalance correction work.

In some embodiments, the additional cut-remove portion extends in a direction orthogonal to a centripetal direction of the rotary fluid element from the first cut-remove portion, within the blade gap in which the first cut-remove portion is disposed.

In this case, the additional cut-remove portion extends in a direction orthogonal to a centripetal direction of the rotary fluid element from the first cut-remove portion, within the blade gap in which the first cut-remove portion is disposed, and thus, if an amount of unbalance is relatively large, the large amount of unbalance can be removed at once in the second cutting work. Accordingly, it is possible to improve workability of the unbalance correction work.

A method of correcting unbalance of a rotary fluid element, according to some embodiments of the present invention, is for a rotary fluid element which includes a plurality of blades extending in a centrifugal direction on an outer peripheral surface of a boss portion and disposed at intervals in a circumferential direction, and on which a cut-remove portion for reducing unbalance between the blades adjacent to each other in the circumferential direction is to be provided, and the method comprises: a first step of setting a plurality of regions including a region which includes a radially-outer rim portion and a region which is disposed radially inside the region, between the plurality of blades adjacent to each other in a circumferential direction of the rotary fluid element; a second step of determining an amount and a position of unbalance of the rotary fluid element; a third step of selecting the region including the radially-outer rim portion from among the plurality of regions, and obtaining a cut position and a cut amount of the selected region, on the basis of the amount and position of unbalance of the rotary fluid element determined in the second step; a fourth step of cutting and removing for a first time the cut amount obtained in the third step at the cut position, on the basis of the cut position and the cut amount obtained in the third step, to form a first cut-remove portion; a fifth step of determining an amount and a position of unbalance for the rotary fluid element which is cut and removed in the first step; a sixth step of selecting a region other than the selected region from among the plurality of regions, and obtaining a cut position and a cut amount of the currently selected region, on the basis of the amount and the position of unbalance determined in the fifth step; and a seventh step of cutting and removing for a second time the cut amount obtained in the sixth step at the cut position, on the basis of the cut position and the cut amount obtained in the sixth step to, form an additional cut-remove portion.

In this case, according to the above method of correcting unbalance of the rotary fluid element, if unbalance is remaining in the rotary fluid element after the first cutting-and-removing, an amount and a position of unbalance are determined for the second time, and a region other than the region selected in the first time is selected on the basis of the amount and position of unbalance determined for the second time, a cut position and a cut amount for the currently selected region are obtained, and the second cutting-and-removing is performed on the basis of the obtained cut position and cut amount. Accordingly, cutting-and-removing is performed on different positions for the first time and the second time, and thus unbalance remaining after the first cutting-and-removing can be processed and corrected at a desired cut amount. Thus, it is possible to achieve a method of correcting unbalance of a rotary fluid element in a necessary and sufficient amount without sacrificing the strength of blades.

In some embodiments, the fifth to seventh steps are repeated until the amount of unbalance reaches a predetermined value or less.

In this case, the fifth to seventh steps are repeated until the amount of unbalance reaches or falls below a predetermined amount, which makes it possible to cut and remove a necessary and sufficient amount of unbalance even more reliably.

In some embodiments, the plurality of regions set in the first step is a plurality of annular regions which are concentric and centered at a rotational center of the rotary fluid element, and which have different radii, the region selected in the third step is an annular region disposed outermost in the radial direction of the plurality of annular regions, and the region selected in the sixth step is selected from the annular regions other than the annular region disposed outermost in the radial direction, on the basis of the amount and the position of unbalance determined in the fifth step.

In this case, the plurality of regions set in the first step is a plurality of annular regions which are concentric and centered at a rotational center of the rotary fluid element, and which have different radii, the region selected in the third step is an annular region disposed outermost in the radial direction of the plurality of annular regions, and the region selected in the sixth step is selected from the annular regions other than the annular region disposed outermost in the radial direction, on the basis of the amount and the position of unbalance determined for the second time in the fifth step. Thus, the second cutting-and-removing is performed on the radially-inner side of the rotary fluid element with respect to the position of the first cutting-and-removing, and thereby it is possible to differentiate the two cutting-and-removing positions. Accordingly, unbalance remaining after the first cutting-and-removing can be processed and corrected at a desired cut amount, and thereby it is possible to cut and remove a necessary and sufficient amount of unbalance.

In some embodiments, an allowable cut amount which can be cut and removed is set for each of the plurality of regions, and the region selected in the sixth step is a region which does not exceed the allowable cut amount.

In this case, an allowable cut amount which can be cut and removed is set for each of the plurality of regions, and the region selected in the sixth step is a region which does not exceed the allowable cut amount, and thus, a region can be selected on the basis of the determination of whether an obtained cut amount is greater than an allowable cut amount. Accordingly, determination can be made easier in selecting a region.

In some embodiments, the cut position obtained in the sixth step is a position on a virtual line connecting the cut position obtained in the third step and a rotational center of the rotary fluid element, within the selected region.

In this case, the cut position obtained in the sixth step, which is the cut position for the second time, is a position on a virtual line connecting the cut position obtained in the third step and a rotational center of the rotary fluid element, within the selected region, and thus, a vector of a centrifugal force corresponding to a mass of unbalance remaining after the first cutting-and-removing and a vector of a centrifugal force at the cut position for the second time can be disposed on the same line during rotation of the rotary fluid element. Accordingly, unbalance can be reduced effectively, which makes it possible to cut and remove a necessary and sufficient amount of unbalance more reliably.

Further, in some embodiments, a map is provided in advance, in which a cut amount corresponding to an amount of unbalance of the rotary fluid element is set for each of the plurality of regions, and the cut amount obtained in the sixth step is obtained on the basis of the map in accordance with the amount of unbalance determined in the fifth step.

In this case, a map is provided in advance, in which a cut amount corresponding to an amount of unbalance of the rotary fluid element is set for each of the plurality of regions, and the cut amount obtained in the sixth step is obtained on the basis of the map in accordance with the amount of unbalance determined in the fifth step, and thus, the cut amount can be obtained readily in the sixth step via the map. Accordingly, complex calculation is no longer necessary when a cut amount is obtained in the sixth step. Thus, it is possible to achieve a method of correcting unbalance of a rotary fluid element, whereby a cutting-and-removing work can be readily performed.

In some embodiments, the plurality of regions set in the first step is a pair of phase regions disposed on opposite phases from each other, on one side and the other side in the radial direction across a rotational center of the rotary fluid element. The region selected in the third step is one of the pair of phase regions which includes the radially-outer rim portion. The region selected in the sixth step is the phase region opposite from the phase region selected in the third step.

In this case, one of the pair of phase regions which includes the radially-outer rim portion is selected on the basis of the first amount and position of unbalance of the rotary fluid element, and the region selected in the sixth step is the phase region opposite from the phase region selected in the third step, and thus, the cut position of the first cutting-and-removing is different from the position of the second cutting-and-removing. Accordingly, the second correction processing for correcting unbalance that remains after the first correction can be performed with slight adjustment, and thereby it is possible to cut and remove a necessary and sufficient amount of unbalance more reliably.

In some embodiments, the cut amount obtained in the third step is larger than the cut amount obtained in the second step so that an amount of unbalance smaller than the amount of unbalance determined in the second step is created in the opposite phase region, and in the fourth step, the selected phase region is cut and removed on the basis of the cut amount obtained in the third step, and in the sixth step, the opposite phase region is cut and removed on the basis of the amount and position of unbalance determined in the fifth step.

In this case, in the fourth step, the selected phase region is cut and removed on the basis of a larger cut amount, and in the sixth step, the opposite phase region is cut and removed on the basis of the amount and position of unbalance determined in the fifth step. Thus, the first unbalance correction may be performed with a lower accuracy, and the second unbalance correction may be performed with a higher accuracy. For instance, if the cut amount in the first correction processing is less than or greater than a required cut amount, slight adjustment can be performed in the second correction. Accordingly, unbalance correction can be facilitated while enhancing the reliability in cutting and removing a necessary and sufficient amount of unbalance.

Advantageous Effects

According to at least some embodiments of the present invention, it is possible to provide a rotary fluid element and a method of correcting unbalance of a rotary fluid element, whereby unbalance of the rotary fluid element can be corrected multiple times in a necessary and sufficient amount without sacrificing the strength of blades.

BRIEF DESCRIPTION OF DRAWINGS

FIG. 6 shows maps where a cut amount is set corresponding to an unbalance amount set for each region.

DETAILED DESCRIPTION

Embodiments of a rotary fluid element and a method of correcting unbalance of a rotary fluid element according to the present invention will now be described with reference to FIGS. 1 to 10. In the embodiments, a compressor wheel of a turbocharger is described as an example of a rotary fluid element. A rotary fluid element is not limited to a compressor wheel of a turbocharger, and may be a turbine wheel of a turbocharger disposed opposite from the compressor wheel. It is intended, however, that unless particularly specified, materials, shapes, relative positions and the like of components described in the embodiments shall be interpreted as illustrative only and not intended to limit the scope of the present invention.

Figure 2A:
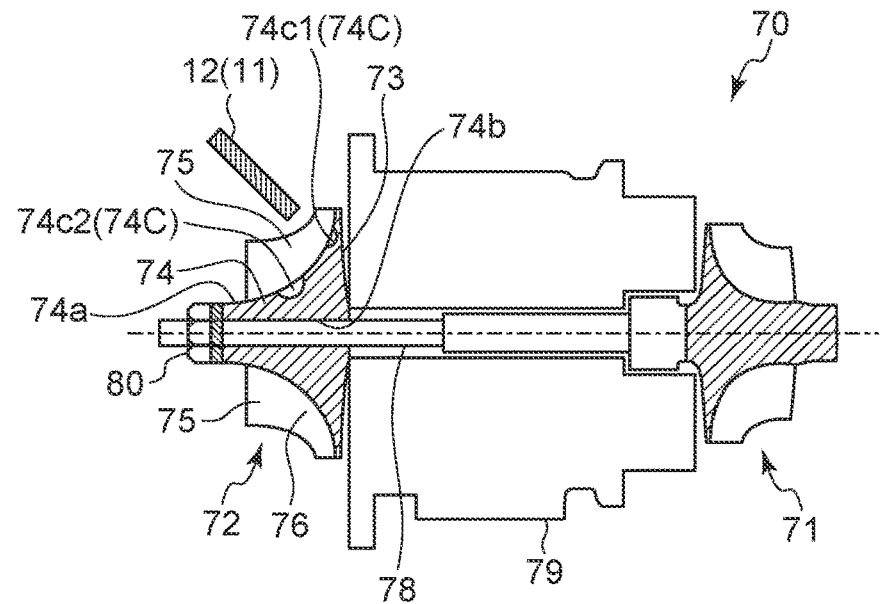
FIG. 2A is a cross-sectional explanatory diagram of a supercharger to which a method of correcting unbalance is applied.

Firstly, a turbocharger 70 to which a rotary fluid element is to be applied will be outlined, before describing a rotary fluid element and a method of correcting unbalance of a rotary fluid element according to the present invention. As depicted in FIG. 2A (cross-sectional explanatory diagram), the turbocharger 70 includes a turbine wheel 71 driven to rotate by exhaust gas of an engine, a compressor wheel 72 which rotates integrally with the turbine wheel 71 to supply the engine with compressed air, and a rotary shaft 78 coupled to the turbine wheel 71 at one end and to the compressor wheel 72 at the other end.

The turbocharger 70 includes a turbine housing (not depicted) surrounding the turbine wheel 71, a compressor housing (not depicted) surrounding the compressor wheel 72, and a bearing housing 79 which supports the rotary shaft 78 rotatably.

The compressor wheel 72 is casted from aluminum, titan, or the like, and is cut into shape by a lathe. The compressor wheel 72 includes a back plate 73 of a disc shape, a boss portion 74 formed into a truncated conical shape and disposed integrally with the back plate 73 so as to protrude from a surface of the back plate 73 in a direction orthogonal to the surface of the back plate 73, and a plurality of blades 75 formed integrally from an outer peripheral surface 74a of the boss portion 74 to the back plate 73.

Figure 2B:
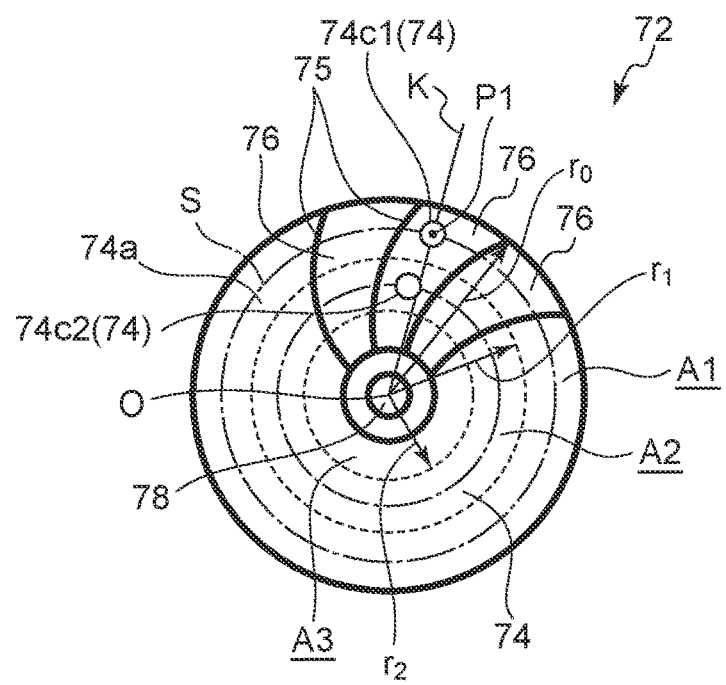
FIG. 2B is a side view of a compressor wheel of a supercharger with multiple unbalance corrections performed in a radial direction of the compressor wheel.

As depicted in FIGS. 2A and 2B (side view), the plurality of blades 75 extends so as to be inclined in a centrifugal direction on the outer peripheral surface 74a of the boss portion 74 of the compressor wheel 72. The outer peripheral surface 74a of the boss portion 74 is exposed in a gap between two of the blades 75 disposed adjacent in the circumferential direction of the compressor wheel 72 (this gap is hereinafter referred to as "blade gap 76"). At the blade gap 76, the boss portion 74 has a cross-sectional shape whose dimension in the radial direction gradually increases so that the width widens, from a top portion disposed opposite from the back plate 73 of the boss portion 74 toward a bottom portion on the side of the back plate 73, and is formed so as to connect to the back plate 73 at a location where the width reaches its maximum. Thus, the boss portion 74 of the compressor wheel 72 has a thickness, in the axial direction, which is the smallest at a radially-outer end portion, and which increases gradually toward the radially inner side from the radially-outer end portion. Further, the boss portion 74 has a thickness, in the radial direction, which gradually reduces toward the radially inner side. The thickness of the boss portion 74, both in the axial direction and the radial direction, relates to a cut-remove portion 74 of the boss portion 74 at the blade gap 76, which is to be cut and removed to correct unbalance of the compressor wheel 72 described below.

A through hole 74b that penetrates through the boss portion 74 from the top portion to the bottom portion is disposed in the center of the compressor wheel 72. A rotary shaft 78 is inserted through the through hole 74b, and a nut 80 is screwed to the rotary shaft 78 protruding from a distal end portion of the boss portion 74, whereby the compressor wheel 72 is joined integrally to the rotary shaft 78.

Figure 3:
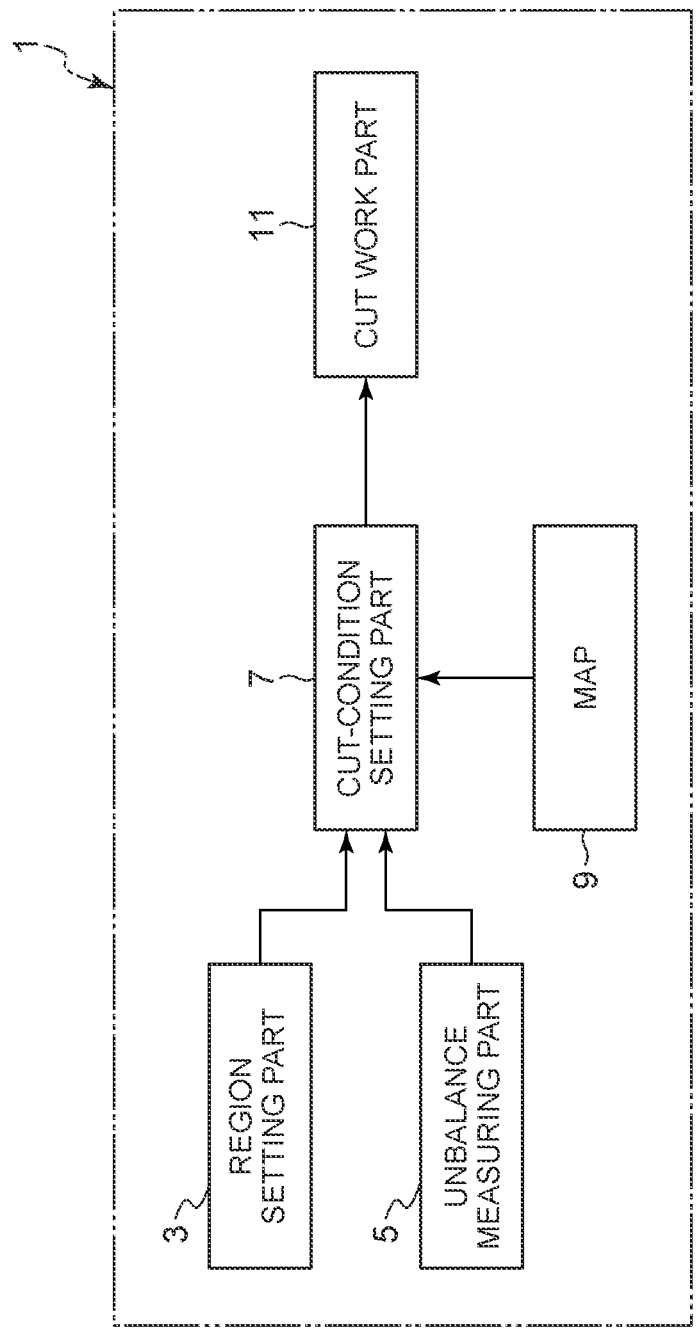
FIG. 3 is a block diagram of an unbalance correcting device for a rotary fluid element.

Next, an unbalance correcting device which is subject to application of a method of correcting unbalance of a rotary fluid element according to the present invention will now be described with reference to FIGS. 2B and 3. As depicted in FIG. 3, the unbalance correcting device 1 includes a region setting part 3, an unbalance measuring part 5, a cut-condition setting part 7, a map 9, and a cut work part 11. The region setting part 3 has a function of setting a plurality of different regions in the blade gap 76 serving as a removal-target portion of the compressor wheel 72 (rotary fluid element). In the present embodiment, as depicted in FIG. 2B, three annular regions A1, A2, A3 are set, which are concentric and centered at the rotational center O of the compressor wheel 72 and which have different radii.

The region A1 has a radius r1 smaller than the radius r0 of the compressor wheel 72. The width of the region A1, which is a difference between the radius r0 and the radius r1, is greater than a diameter of a drill 12 (see FIG. 2A) which constitutes the cut work part 11. Each of the region A2 and the region A3 also has a width as large as the width of the region A1. Thus, when the drill 12 cuts a hole in one of the regions A1, A2, A3, the drill 12 is less likely to enter adjacent one of the regions A1, A2, A3. The cut work part 11 in the case of FIGS. 9 and 10 described below is provided with an end mill instead of the drill 12.

The unbalance measuring part 5 has a function of obtaining an amount and a position of unbalance for the compressor wheel 72. For instance, the unbalance measuring part 5 detects a mark disposed on the compressor wheel 72 which is rotatably retained, with an optical sensor (not depicted) while rotating the compressor wheel 72, and measures an amount and a position of unbalance of the compressor wheel 72 from detected signals sent from two acceleration detectors (not depicted) on the basis of the mark. Accordingly, the unbalance measuring part 5 measures a weight and an angular position of unbalance, referring to the mark as zero position.

The cut-condition setting part 7 has a function of selecting a region from among the three regions A1, A2, A3 set by the region setting part 3 and obtaining a cut position and a cut amount for the selected region, on the basis of the amount and the position of unbalance of the compressor wheel 72 determined by the unbalance measuring part 5. At the time of selecting the first region, the cut-condition setting part 7 selects a region disposed outermost of the compressor wheel 72, which is the region A1. On the basis of the measured amount and position of unbalance, a cut amount and a cut position are set in the region A1. A cut position P1 is set at an intersection of a center line S with respect to the width direction of the region A1 and a virtual line K passing through the rotational center O of the compressor wheel 72 and the measured position of unbalance. Except, if the intersection is on a blade or so close to a blade that may raise a problem in strength, the closest point to the intersection on the center line S that can be cut and removed is set. Furthermore, the cut amount is set so that the measured amount of unbalance can be cut and removed, on the basis of the distance between the rotational center O of the compressor wheel 72 and the cut position P1 and the specific gravity of a material.

Further, if the amount and position of unbalance of the compressor wheel 72 which is cut and removed is measured again, the cut-condition setting part 7 selects a region (A2, A3) other than the selected region (A1) from among the three regions A1, A2, A3 on the basis of the amount and the position of unbalance of re-determined by the unbalance measuring part 5, and obtains a cut position and a cut amount for the currently selected region. When a region is to be re-selected, the cut-condition setting part 7 selects a region so as not to exceed an allowable cut amount, on the basis of the map 9, in which an allowable cut amount (see FIG. 6; Cn, Dn) that can be cut and removed is set for each of the plurality of regions. Such selection prevents a risk of strength reduction of the compressor wheel due to an excessive cut amount.

Furthermore, when obtaining a cut position for correcting unbalance after recalculation of an amount and a position of unbalance of the compressor wheel 72 which is cut and removed, the cut-condition setting part 7 sets a cut position at an intersection of a center line with respect to the width direction within the selected region and a virtual line passing through the rotational center O of the compressor wheel 72 and the measured position of unbalance. Except, if the intersection is on a blade or so close to a blade that may raise a problem in strength, the closest point to the intersection on the center line that can be cut is set.

Furthermore, when obtaining a cut amount for correcting unbalance after recalculation of an amount and a position of unbalance of the compressor wheel 72 which is cut and removed, the cut-condition setting part 7 refers to the map 9, in which a cut amount corresponding to an amount of unbalance of the compressor wheel 72 is set for each of the plurality of regions. The map 9 is provided for each of the regions A1, A2, A3, as depicted in FIG. 6. In the map 9, for instance, for the region A1, if the measured amount of unbalance is U1, U2, or U3, the cut amount is set to be C1, C2, or C3, respectively, and an allowable maximum cut amount (allowable cut amount Cn (max)) is also set. Further, if the measured amount of unbalance is not in the map 9, the cut-condition setting part 7 calculates a cut amount on the basis of two cut amounts corresponding to two amounts of unbalance specified in the map 9 which are just below and above the measured amount of unbalance.

Furthermore, in the map 9, for instance, for the region A2, if the measured amount of unbalance is U1, U2, or U3, the cut amount is set to be D1, D2, or D3, respectively, and an allowable maximum cut amount (allowable cut amount Dn (max)) is also set. Herein, the following relationships are satisfied: D1>C1, D2>C2, D3>C3, and Dn>Cn.

As depicted in FIG. 2A, the cut work part 11 processes the boss portion 74 in the blade gap 76 of the compressor wheel 72 into a circular shape with the drill 12. A recessed portion 74c having a drill-tip shape is formed on the outer peripheral surface 74a of the boss portion 74 processed by the drill 12.

Figure 4:
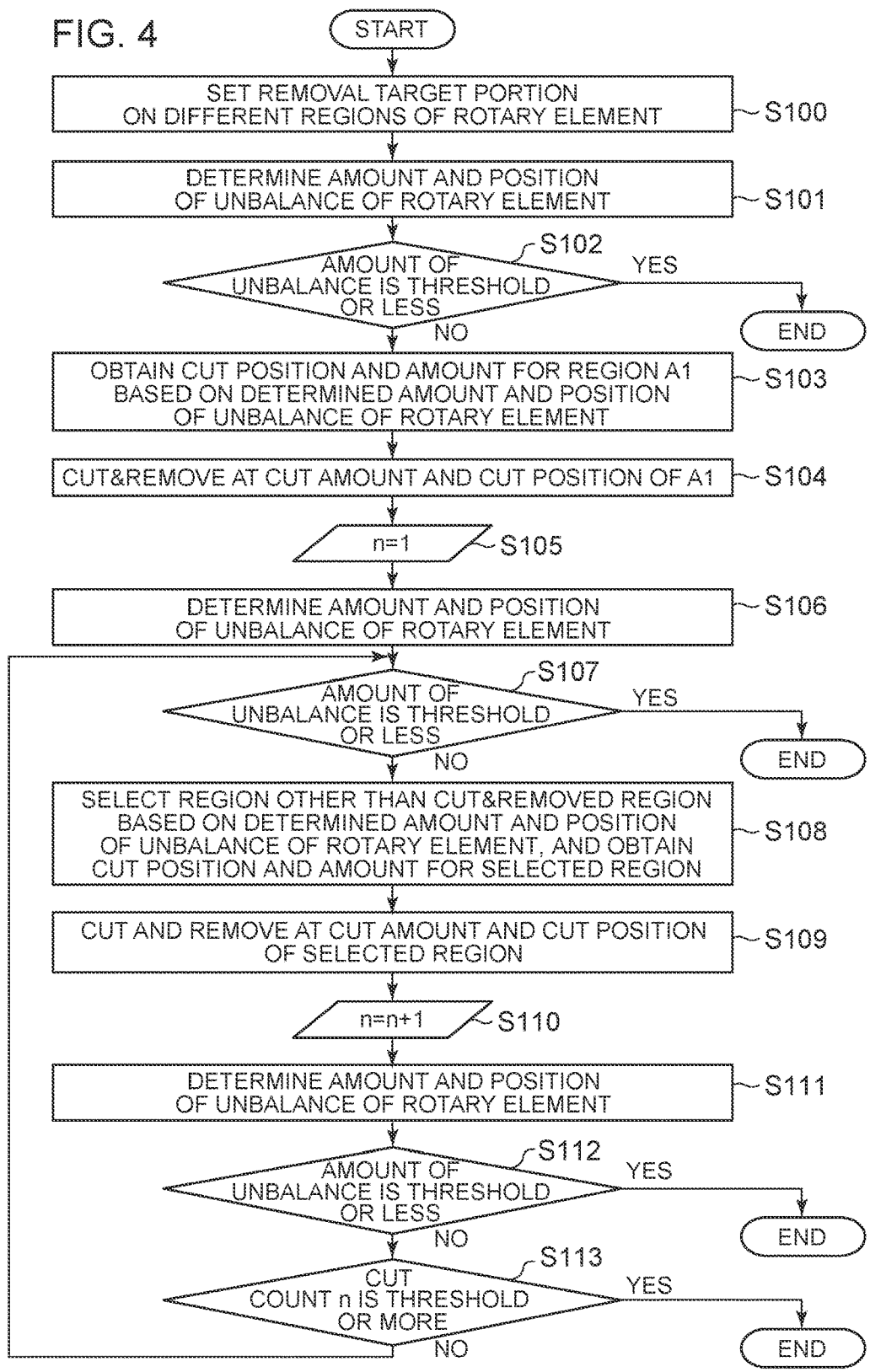
FIG. 4 is a flowchart of a method of correcting unbalance of a rotary fluid element.

Next, in accordance with operation of the unbalance correcting device 1, a method of correcting unbalance of a rotary fluid element according to the present invention and a rotary fluid element (compressor wheel 72) corrected by the method will now be described with reference to FIGS. 1 and 5. As depicted in FIGS. 2B, 3, and 4, the region setting part 3 sets a plurality of different regions A1, A2, A3 in the blade gap 76, which serves as a removal-target portion of the compressor wheel 72 (step 100). In the present embodiment, three annular regions A1, A2, A3 are set, which are concentric and centered at the rotational center O of the compressor wheel 72 and which have different radii (see FIG. 2B).

The unbalance measuring part 5 has a function of determining an amount and a position of unbalance for the compressor wheel 72 (step 101). The process ends if the amount of unbalance determined in step 101 is not greater than a threshold value, or advances to step 103 if the amount is greater than the threshold value (step 102). In step 103, the cut-condition setting part 7 selects a region including a radially-outer rim portion, which is the region A1 disposed outermost in the radial direction, from among the three regions A1, A2, A3, on the basis of the amount and the position of unbalance of the compressor wheel 72 determined in step 101, and obtains a cut position and a cut amount for the selected region A1.

The cut work part 11 performs the first cutting-and-removing at the obtained cut amount at the cut position of the selected region, which is the region A1 (step 104). The cut count number n is set to 1 (step 105). The unbalance measuring part 5 determines again an amount and a position of unbalance for the compressor wheel 72 which is cut and removed (step 106). The process ends if the amount of unbalance determined in step 106 is not greater than a threshold value, or advances to step 108 if the amount is greater than the threshold value (step 107). The region setting part 3 selects an additional region other than the already selected region, which is the region A1, from among the plurality of regions A1, A2, A3, on the basis of the amount and position of unbalance determined in step 106 (step 108a, see FIG. 5). While it is desirable to select additional regions in the order of A2, A3 so as to advance radially inward in sequence, a condition may be set such that an allowable cut amount of a selected region should be greater than the cut amount obtained in step 103, and if the condition is not met, A3 may be selected before A2.

Figure 5:
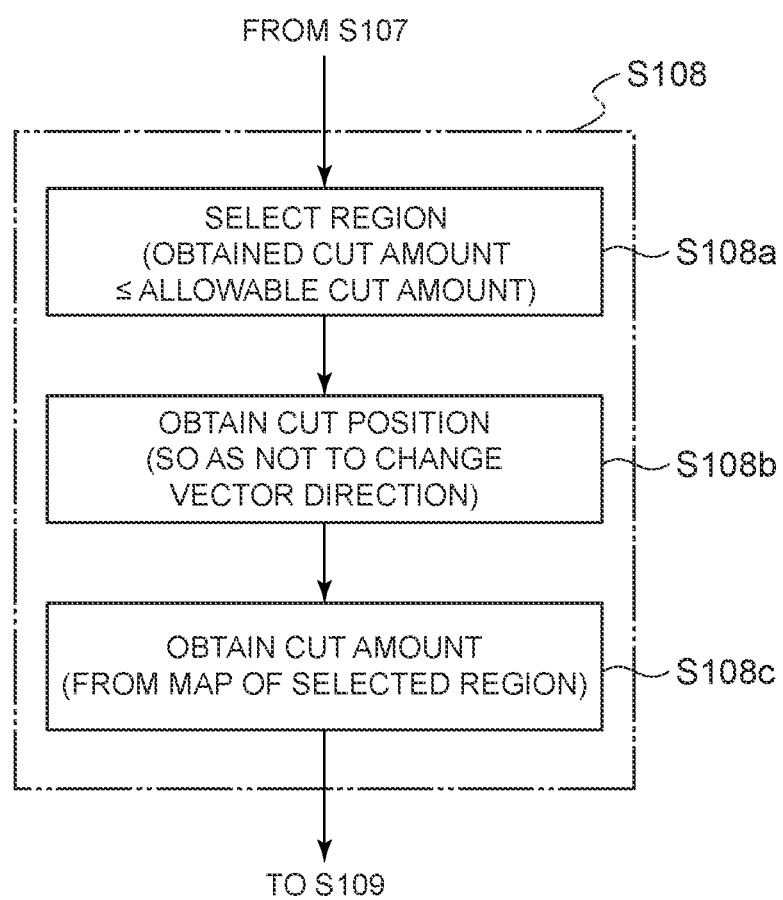
FIG. 5 is a detailed flowchart of step 105 in the flowchart.

The cut-condition setting part 7 obtains a cut position of the selected additional region (step 108b, see FIG. 5). The cut-condition setting part 7 obtains a cut position by setting an intersection of a center line with respect to the width direction within the selected additional region and a virtual line passing through the rotational center O of the compressor wheel 72 and the measured position of unbalance. Except, if the intersection is on a blade or so close to a blade that may raise a problem in strength, the cut position is obtained to be on the closest point to the intersection on the center line that can be cut. Specifically, if the cut-and-remove portion of the region A1 cannot be set on the virtual line K in order to avoid a blade, an unbalance vector before cutting-and-removing and a remaining unbalance vector may be different. Thus, obtaining a fresh cutting position makes it possible to reduce unbalance effectively and to cut and remove a necessary and sufficient amount of unbalance more reliably.

The cut-condition setting part 7 obtains a cut amount for the selected region A2 (step 108c, FIG. 5). A cut amount is obtained on the basis of the map 9 in accordance with the amount of unbalance determined in step 103. Thus, a cut amount can be readily obtained via the map 9. Accordingly, complex calculation is unnecessary when obtaining a cut amount in the sixth step. Thus, it is possible to achieve the unbalance correcting device 1 for a rotary fluid element and a method of correcting unbalance of a rotary fluid element, whereby a cutting-and-removing work can be readily performed.

Figure 1A:
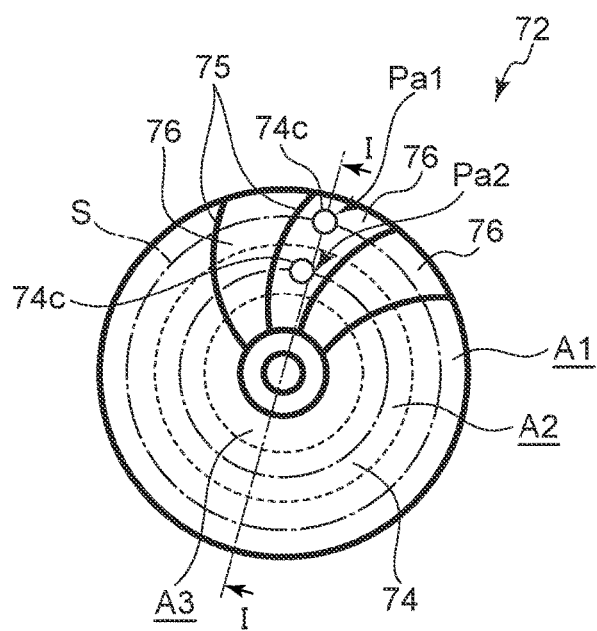
FIG. 1A is a planar view of a rotary fluid element after unbalance correction.
Figure 1B:
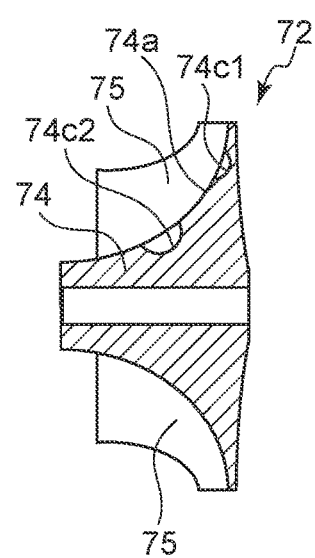
FIG. 1B is a cross-sectional view corresponding to a view in a direction of arrow I-I in FIG. 1B.

The cut work part 11 performs the second cutting-and-removing at the cut amount obtained in the sixth step at the cut position in the additional region selected in step 108a (step 109). Accordingly, as depicted in FIGS. 1A and 1B, the compressor wheel (rotary fluid element) 72 is obtained, whose unbalance is corrected by the two cut-remove portions 74c disposed on different positions on the outer peripheral surface 74a of the boss portion 74.

Then, 1 is added to the cut count number and the number becomes 2 (110). The unbalance measuring part 5 determines an amount and a position of unbalance for the compressor wheel 72 (step 111). The process ends if the amount of unbalance obtained in step 111 is not greater than a threshold value, or advances to step 113 if the amount is greater than the threshold value (step 112). In step 113, the process ends if the cut count number is greater than a threshold value, or returns to step 108 if the cut count number is not greater than the threshold value, to perform the third unbalance adjustment.

The compressor wheel 72 whose unbalance is corrected in step 109 has: the first cut-remove portion 74c1 cut and removed on a position substantially in the center of the blade gap 76 between a pair of two blades disposed adjacent in the circumferential direction within the region A1 positioned outermost in the radial direction (hereinafter, the position will be referred to as "radially-outer rim portion Pa1"); and the additional cut-remove portion 74c2 cut and removed on a radially-inner portion Pa2 which is disposed radially inside the first cut-remove portion 74c1 and within the additional region radially inside the region A1. These first cut-remove portion 74c1 and additional cut-remove portion 74c2 make it possible to obtain the compressor wheel 72 (rotary fluid element), on which unbalance correction is performed in a necessary and sufficient amount without sacrificing the strength of the blades 75.

If the process returns to step 108 and the third unbalance adjustment is to be performed, the region setting part 3 selects an additional region (A3) other than the already selected regions, which are the regions A1, A2, from among the plurality of regions A1, A2, A3, on the basis of the amount and position of unbalance determined in step 111 (step 108a, see FIG. 5).

The cut-condition setting part 7 obtains a cut position of the selected additional region (step 108b, see FIG. 5). The cut-condition setting part 7 obtains a cut position by setting an intersection of a center line with respect to the width direction within the selected additional region and a virtual line passing through the rotational center O of the compressor wheel 72 and the measured position of unbalance. Except, if the intersection is on a blade or so close to a blade that may raise a problem in strength, the cut position is obtained to be on the closest point to the intersection on the center line that can be cut. Specifically, if the cut-and-remove portion of the region A1 cannot be set on the virtual line K in order to avoid a blade, an unbalance vector before cutting-and-removing and a remaining unbalance vector may be different. Thus, obtaining a fresh cutting position makes it possible to reduce unbalance effectively and to cut and remove a necessary and sufficient amount of unbalance more reliably.

The cut-condition setting part 7 obtains a cut position of the selected additional region A3 (step 108c, see FIG. 5). The cut amount is obtained on the basis of the map 9 in accordance with the amount of unbalance determined in step 108. Thus, the cut amount can be readily obtained via the map 9. Accordingly, complex calculation is unnecessary when obtaining a cut amount. Thus, it is possible to achieve the unbalance correcting device 1 for a rotary fluid element and a method of correcting unbalance of a rotary fluid element, whereby a cutting-and-removing work can be readily performed.

Figure 7A:
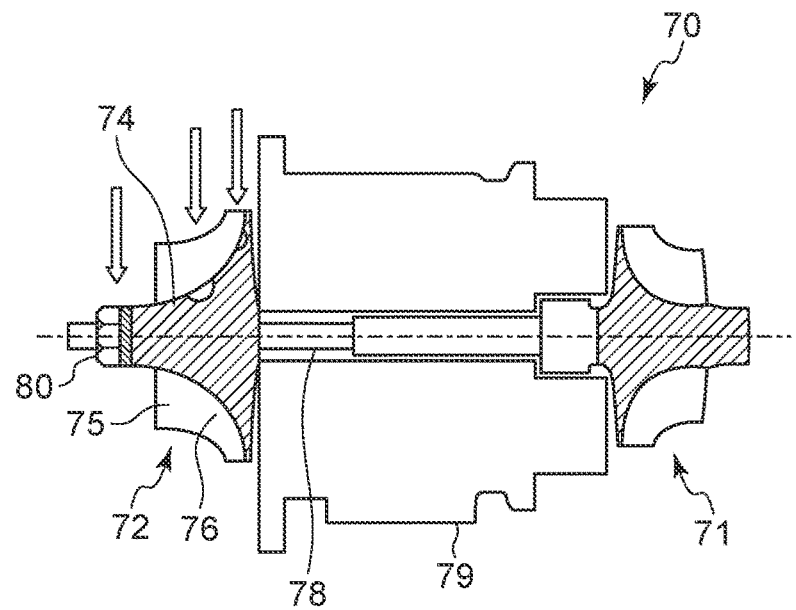
FIG. 7A is a cross-sectional explanatory diagram of a supercharger to which another method of correcting unbalance is applied.
Figure 7B:
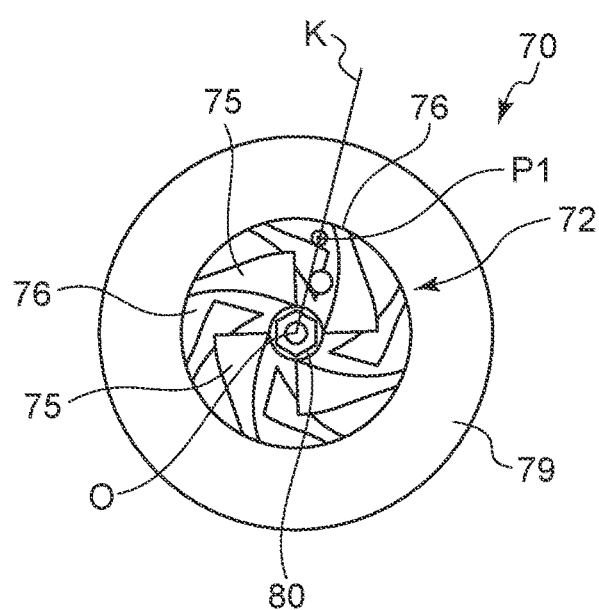
FIG. 7B is a side view of a compressor wheel of a supercharger with another unbalance correction performed for multiple times in a radial direction of the compressor wheel.

As described above, in the method of correcting unbalance of a rotary fluid element according to the present embodiment, in step 105b, the cut position is obtained for the second time so that the cut position is on the virtual line K connecting the cut position P1 obtained within the already selected region, which is the region A1, and the rotational center O of the compressor wheel 72. Thus, as depicted in FIGS. 7A and 7B, it is possible to perform the cutting-and-removing for correcting unbalance also on a portion corresponding to the nut 80 disposed on the virtual line connecting the cut position P1 of the first time and the rotational center O of the compressor wheel 72. Accordingly, it is possible to correct a larger amount of unbalance as well. Thus, it is possible to cut and remove a necessary and sufficient amount of unbalance even more reliably, and to improve yielding of the turbocharger 70, which is a final product.

Figure 8A:
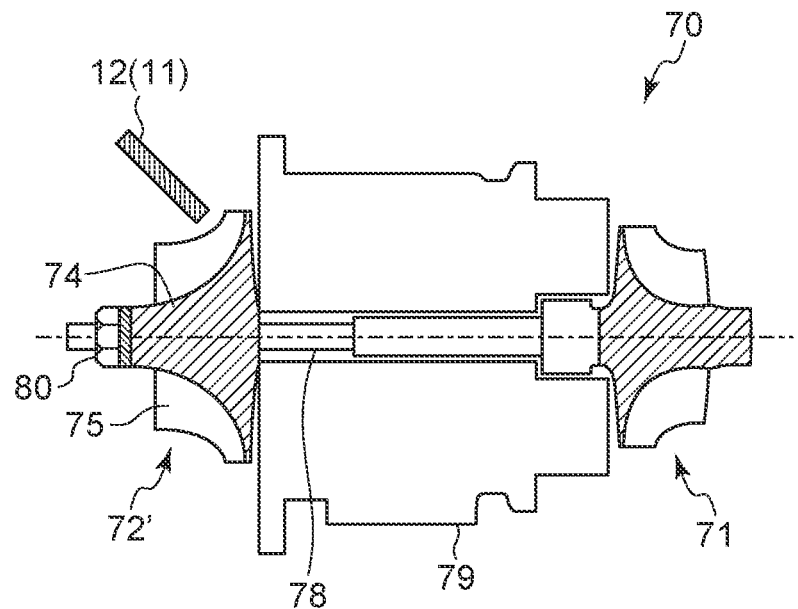
FIG. 8A is a cross-sectional explanatory diagram of a supercharger to which another method of correcting unbalance is applied.
Figure 8B:
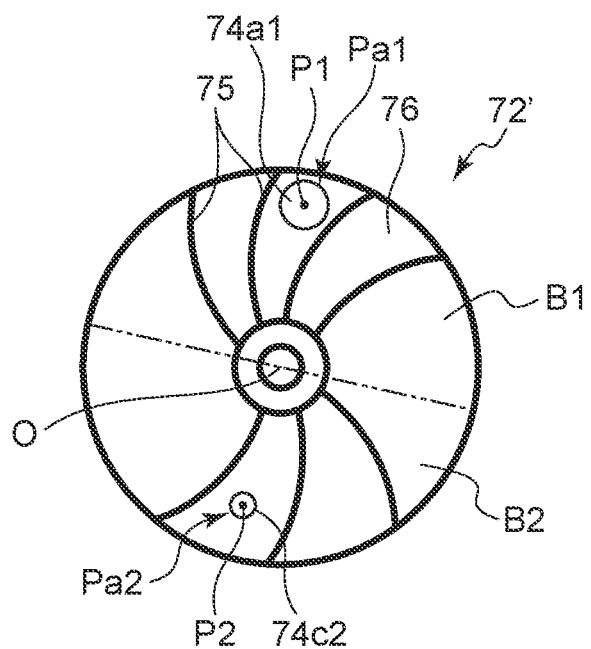
FIG. 8B is a side view of a compressor wheel of a supercharger with another unbalance correction performed for multiple times in a radial direction of the compressor wheel.

Further, while the plurality of regions A1, A2, A3 is set concentric and centered at the rotational center O of the compressor wheel 72 with different radii in the above described embodiment, a pair of phase regions B1, B2 may be set on opposite phases from each other at one side and the other side in the radial direction across the rotational center O of the compressor wheel 72, as shown in FIG. 8B. In this case, the cut amount obtained in step 102 is greater than the cut amount obtained in step 101, so that the amount of unbalance created in the opposite phase region B1 is smaller than the amount of unbalance determined in step 101.

In step 103, on the basis of the cut amount obtained in step 102, the cut work part 11 cuts and removes the selected phase region B1, and in step 106, cuts and removes the opposite phase region B1 on the basis of the amount and position of unbalance determined in step 104, thereby obtaining the compressor wheel (rotary fluid element) 72 whose unbalance is corrected.

The compressor wheel 72' after unbalance correction has: the first cut-remove portion 74c1 cut and removed on the radially-outer rim portion Pa1 substantially in the center of the blade gap 76 between a pair of two blades disposed adjacent in the circumferential direction within the phase region B1; and the additional cut-remove portion 74c2 cut and removed on the radially-inner portion Pa2 which is disposed on the opposite phase from the first cut-remove portion 74c1 and within the phase region B2 opposite from the phase region B1. These first cut-remove portion 74c1 and additional cut-remove portion 74c2 make it possible to obtain the compressor wheel 72' (rotary fluid element), on which unbalance correction is performed in a necessary and sufficient amount without sacrificing the strength of the blades 75.

As described above, the cut position P1 cut and removed for the first time and the cut position P2 cut and removed for the second time are disposed respectively in the phase regions B1, B2 different from each other. Accordingly, the second correction processing for correcting unbalance that remains after the first correction can be performed with slight adjustment, and thereby it is possible to cut and remove a necessary and sufficient amount of unbalance.

Figure 9:
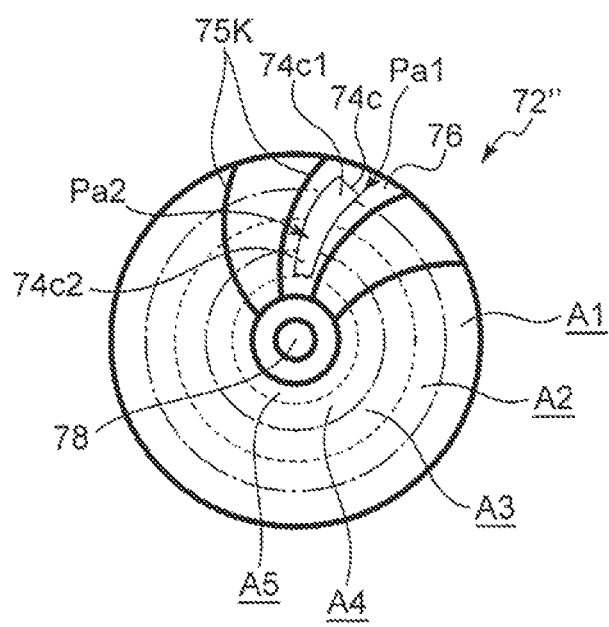
FIG. 9 is a side view of a compressor wheel of a supercharger, provided with a cut extending in a radial direction.

Further, in the above described embodiment, the plurality of annular regions A1, A2, A3 are concentric and centered at the rotational center O of the compressor wheel 72 and have different radii, and each region is cut and removed separately so that the cut and removed portions do not overlap with each other. Alternately, as depicted in FIG. 9, the blade gap 76 with the first cut-remove portion (74c1) may be cut in an elongated slit shape extending continuously in the radial direction inward from the first cut-remove portion 74c1 to obtain the compressor wheel (rotary fluid element) 72" with corrected unbalance.

The compressor wheel 72" after unbalance correction has: the first cut-remove portion 74c1 cut and removed on the radially-outer rim portion Pa1 in the blade gap 76 between a pair of two blades adjacent in the circumferential direction and within the region A1; and the additional cut-remove portion 74c2 cut and removed on the radially-inner portion Pa2 which is disposed over the region A1, the region A2, the region A3, and the region A4 from the first cut-remove portion 74c1. These first cut-remove portion 74c1 and additional cut-remove portion 74c2 make it possible to obtain the compressor wheel 72" (rotary fluid element), on which unbalance correction is performed in a necessary and sufficient amount without sacrificing the strength of the blades 75.

As described above, the first cut-remove portion 74c1 and the additional cut-remove portion 74c2 are connected to each other to form an elongated slit shape, and thereby it is possible to increase the amount of unbalance correction. Accordingly, it is possible to correct a larger amount of unbalance as well. Thus, it is possible to cut and remove a necessary and sufficient amount of unbalance even more reliably, and to improve yielding of the turbocharger 70, which is a final product.

Figure 10:
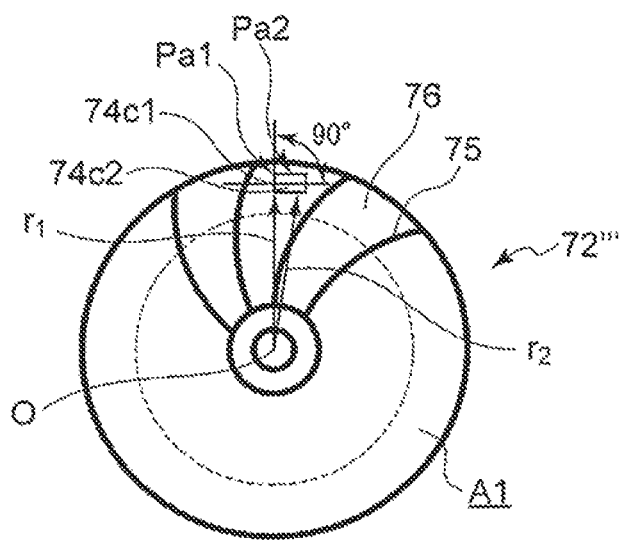
FIG. 10 is a side view of a compressor wheel of a supercharger, provided with a cut extending in a direction orthogonal to a centripetal direction.

Further, in the above described embodiment, the plurality of regions A1, A2, A3 are concentric and centered at the rotational center O of the compressor wheel 72 and have different radii in the above described embodiment, and each region is cut and removed separately so that the cut and removed portions do not overlap with each other. Alternately, as depicted in FIG. 10, the blade gap 76 with the first cut-remove portion 74c1 within the region A1 may be cut in an elongated slit shape extending continuously in a direction orthogonal to the centripetal direction of the compressor wheel 72 from the first cut-remove portion 74c1 to obtain the compressor wheel (rotary fluid element) 72''' with corrected unbalance.

The compressor wheel 72''' after unbalance correction has the first cut-remove portion 74c1 cut and removed on the radially-outer rim portion Pa1 in the blade gap 76 between a pair of two blades adjacent in the circumferential direction and within the region A1; and the additional cut-remove portion 74c2 of an elongated slit shape cut and removed on the radially-inner portion Pa2 extending continuously in a direction orthogonal to the centripetal direction of the compressor wheel 72 from the first cut-remove portion 74c1. These first cut-remove portion 74c1 and additional cut-remove portion 74c2 make it possible to obtain the compressor wheel 72''' (rotary fluid element), on which accurate unbalance correction is performed without sacrificing the strength of the blades 75. The radius r1 from the rotational center O of the radially-outer rim portion Pa1 and the radius r2 from the rotational center O of the radially-inner portion Pa2 satisfy a relationship of r1>r2.

As described above, the first cut-remove portion 74c1 and the additional cut-remove portion 74c2 are connected to each other to form a linear shape, and thereby it is possible to increase the amount of unbalance correction. Accordingly, it is possible to correct a larger amount of unbalance as well. Thus, it is possible to cut and remove a necessary and sufficient amount of unbalance even more reliably, and to improve yielding of the turbocharger 70, which is a final product.

The embodiments of the present invention have been described above. However, the present invention is not limited thereto, and various modifications may be applied as long as they do not depart from the object of the present invention. For instance, some of the above described embodiments may be combined upon implementation.

DESCRIPTION OF REFERENCE NUMERAL

1 Unbalance correcting device
3 Region setting part
5 Unbalance measuring part
7, 23 Cut-condition setting part
9 Map
11 Cut work part
12 Drill
70 Turbocharger
71 Turbine wheel
72, 72', 72", 72''' Compressor wheel (rotary fluid element)
73 Back plate
74 Boss portion
74a Outer peripheral surface
74b Through hole
74c Cut-remove portion
74c1 First cut-remove portion
74c2 Additional cut-remove portion
75 Blade
76 Blade gap
78 Rotary shaft
79 Bearing housing
80 Nut
A1, A2, A3 Region
B1, B2 Phase region
K Virtual line
O Rotational center
P1, P2 Cut position
Pa1 Radially-outer rim portion
Pa2 Radially-inner portion

The invention claimed is:

1. A rotary fluid element, comprising:
a plurality of blades extending in radial directions on an outer peripheral surface of a boss portion and disposed at intervals in a circumferential direction;
a first cut-remove portion for reducing a dynamic unbalance of the rotary fluid element, the first cut-remove portion being formed in the boss portion in a single blade gap between adjacent blades by cutting and removing the boss portion;
at least one additional cut-remove portion for further reducing the dynamic unbalance of the rotary fluid element, the at least one additional cut-remove portion being formed in the boss portion by cutting and removing the boss portion on a radially-inner portion in the single blade gap radially inside the first cut-remove portion with respect to a radial direction of the rotary fluid element.

2. The rotary fluid element according to claim 1, wherein the first cut-remove portion is disposed in a first annular region defined radially outside among a plurality of annular regions which are concentric and centered at a rotational center of the rotary fluid element and which have different radii,
wherein the at least one additional cut-remove portion is disposed within a second annular region other than the first annular region.

3. A rotary fluid element, comprising:
a plurality of blades extending in radial directions on an outer peripheral surface of a boss portion and disposed at intervals in a circumferential direction; and
a cut-remove portion for reducing a dynamic unbalance of the rotary fluid element, the first cut-remove portion being formed in the boss portion in a plurality of blade gaps between the blades,
wherein the cut-remove portion includes
a first cut-remove portion being formed in one blade gap by cutting and removing the boss portion, and
at least one additional cut-remove portion being formed in the other blade gap by cutting and removing the boss portion on a radially-inner portion radially inside the first cut-remove portion with respect to a radial direction of the rotary element,
wherein the first cut-remove portion is disposed in one of a pair of regions opposite to one another with respect to a rotational center of the rotary fluid element, and
wherein the at least one additional cut-remove portion is disposed in another one of the pair of regions.

4. A method of correcting unbalance of a rotary fluid element which includes a plurality of blades extending in a radial direction on an outer peripheral surface of a boss portion and disposed at intervals in a circumferential direction, a first cut-remove portion for reducing a dynamic unbalance of the rotary fluid element, the first cut-remove portion being formed in the boss portion in a single blade gap between adjacent blades in the circumferential direction, and at least one additional cut-remove portion for further reducing the dynamic unbalance of the rotary fluid element, the at least one additional cut-remove portion being formed in the boss portion in the single blade gap, the method comprising:
a first step of setting a plurality of regions including a first region which includes a radially-outer rim portion, and setting a second region which is disposed radially inside the first region, between the adjacent blades;
a second step of determining an amount of the dynamic unbalance and a position of the dynamic unbalance of the rotary fluid element;
a third step of selecting the first region, and obtaining a first cut position and a first cut amount in the first region, on the basis of the amount and position determined in the second step;
a fourth step of cutting and removing for a first time the cut amount obtained in the third step at the obtained cut position, on the basis of the cut position and the cut amount obtained in the third step, to form the first cut-remove portion;
a fifth step of further determining an amount of the dynamic unbalance and a position of the dynamic unbalance of the rotary fluid element after forming the first cut-remove portion;
a sixth step of selecting a second region other than the first region from among the plurality of regions, and obtaining a second cut position and a second cut amount in the second region, on the basis of the amount and the position of unbalance determined in the fifth step; and
a seventh step of cutting and removing the second cut amount obtained in the sixth step at the second cut position, on the basis of the second cut position and the second cut amount obtained in the sixth step, to form the at least one additional cut-remove portion.

5. The method of correcting unbalance, according to claim 4,
wherein the fifth to seventh steps are repeated until the amount of the dynamic unbalance reaches a predetermined value or less.

6. The method of correcting unbalance of a rotary fluid element, according to claim 4,
wherein the plurality of regions is a plurality of annular regions concentric and centered at a rotational center of the rotary fluid element, and having different radii,
wherein the first region is one of annular regions in the radial direction among of the plurality annular regions, and
wherein the second region is selected from the plurality of annular regions other than the first annular region, on the basis of the amount and the position of unbalance determined in the fifth step.

7. The method of correcting unbalance of a rotary fluid element, according to claim 6,
wherein an allowable cut amount which can be cut and removed from the boss portion is set for each of the plurality of regions, and
wherein the second region selected in the sixth step is a region which does not exceed the allowable cut amount.

8. The method of correcting unbalance of a rotary fluid element, according to claim 7,
the second cut position obtained in the sixth step is a position on a virtual line connecting the first cut position obtained in the third step and a rotational center of the rotary fluid element, within the second region.

9. The method of correcting unbalance, according to claim 4, further comprising:
providing a map, in which a cut amount corresponding to an amount of unbalance of the rotary fluid element is set for each of the plurality of regions, and
wherein the second cut amount obtained in the sixth step is obtained on the basis of the map in accordance with the amount of the determined dynamic unbalance determined in the fifth step.

10. A method of correcting unbalance of a rotary fluid element which includes a plurality of blades extending in a radial direction on an outer peripheral surface of a boss portion and disposed at intervals in a circumferential direction, a first cut-remove portion for reducing a dynamic unbalance of the rotary fluid element, the first cut-remove portion being formed in the boss portion between adjacent blades in the circumferential direction, and at least one additional cut-remove portion for further reducing the dynamic unbalance of the rotary fluid element, the at least one additional cut-remove portion being formed in the boss portion, the method comprising:

a first step of setting a plurality of regions including a first region which includes a radially-outer rim portion and setting a second region which is disposed radially inside the first region between the adjacent blades;

a second step of determining an amount of the dynamic unbalance and a position of the dynamic unbalance of the rotary fluid element;

a third step of selecting the first region and obtaining a first cut position and a first cut amount in the first region, on the basis of the amount and position determine in the second step;

a fourth step of cutting and removing for a first time the cut amount obtained in the third step at the obtained cut position, on the basis of the cut position and the cut amount obtained in the third step, to form the first cut-remove portion;

a fifth step of further determining an amount of the dynamic unbalance and a position of the dynamic unbalance of the rotary fluid element after forming the first cut-remove portion;

a sixth step of selecting a second region other than the first region from among the plurality of regions, and obtaining a second cut position and a second cut amount in the second region, on the basis of the amount and the position of unbalance determined in the fifth step; and a seventh step of cutting and removing the second cut amount obtained in the sixth step at the second cut position, on the basis of the second cut position and the second cut amount obtained in the sixth step, to form the at least one additional cut-remove portion, wherein the plurality of regions set in the first step is a pair of regions opposite to one another with respect to a rotational center of the rotary fluid element, wherein the first region is one of the pair of regions opposite to one another with respect to the rotational center of the rotary fluid element, and wherein the second region is another one of the pair of regions.

* * * * *